United States Patent

[11] 3,630,832

[72] Inventors Otto V. Ingruber
Vankleek Hill;
Glenn A. Allard, Hawkesbury, Ontario, both of Canada
[21] Appl. No. 871,646
[22] Filed Nov. 10, 1969
[45] Patented Dec. 28, 1971
[73] Assignee Canadian International Paper Company
Montreal, Quebec, Canada
Continuation of application Ser. No. 706,154, Feb. 16, 1968, now abandoned. This application Nov. 10, 1969, Ser. No. 871,646

[54] CONTROLLED ALKALINE SULFITE PULPING
5 Claims, 1 Drawing Fig.
[52] U.S. Cl. .................................................. 162/49, 162/61, 162/83
[51] Int. Cl. ........................................................ D21c 7/14

[50] Field of Search ................................. 162/83, 86, 49, 61

[56] References Cited
UNITED STATES PATENTS

| | | | |
|---|---|---|---|
| 1,566,118 | 12/1925 | Rawling........................ | 162/86 X |
| 2,920,010 | 1/1960 | Voiret........................... | 162/83 X |
| 3,354,030 | 11/1967 | Williams et al. .............. | 162/86 |

Primary Examiner—Howard R. Caine
Attorney—R. G. McClenahan

ABSTRACT: A controlled process of producing sulfite pulps from wood and other cellulosic material wherein the use of sodium sulfide is avoided and the process pH, i.e., the pH in situ or the so-called hot pH, is measured during the pulping or cooking operation and the alkalinity of the cooking medium is adjusted in response to such measurement in a predetermined manner.

PATENTED DEC 28 1971     3,630,832

| YIELD RANGE | COOK NO. | TYPE OF COOK | TOTAL YIELD % | KAPPA NO. | BRIGHTNESS | CANADIAN STANDARD FREENESS | BEATING TIME PFI MINUTES | TEAR STRENGTH | BURST | FOLD | CONCORA | RING CRUSH | APPARENT SPECIFIC VOLUME |
|---|---|---|---|---|---|---|---|---|---|---|---|---|---|
| LOW YIELD | A | KRAFT | 47.2 | 27 | 28.9 | 300 | 7.0 | 94 | 221 | 1605 | — | — | 1.31 |
| | B | ALKALINE SULFITE CONTROLLED AT pH 8.0 | 46.3 | 46 | 29.8 | 300 | 6.0 | 104 | 222 | 1810 | — | — | 1.32 |
| | C | ALKALINE SULFITE CONTROLLED AT pH 9.5 | 45.6 | 23 | 33.0 | 300 | 6.1 | 112 | 190 | 2000 | — | — | 1.29 |
| INTERMEDIATE YIELD | D | KRAFT | 63.3 | 140 | 18.1 | 450 | 19.3* | 104 | 134 | 782 | 64.5 | 50.3 | 1.58 |
| | E | ALKALINE SULFITE CONTROLLED AT pH 8.0 | 67.8 | 127 | 43.6 | 450 | 5.8* | 67 | 166 | 470 | 76.4 | 61.4 | 1.38 |
| | F | pH 9.0 | 64.6 | 131 | 28.8 | 450 | — | 99 | 145 | 682 | — | — | 1.48 |
| HIGH YIELD | G | KRAFT | 78.5 | 153 | 16.8 | 450 | 74.0* | 109 | 75 | 260 | 57.8 | 47.0 | 1.85 |
| | H | ALKALINE SULFITE CONTROLLED AT pH 8.0 | 76.4 | 148 | 39.2 | 450 | 15.5* | 62 | 142 | 292 | 71.2 | 51.0 | 1.44 |

*REFINING TIME (IN A RAFFINATOR)

OTTO V. INGRUBER
GLENN A. ALLARD
    INVENTORS

BY

ATTORNEY

CONTROLLED ALKALINE SULFITE PULPING

This application is a continuation of application Ser. No. 706,154 filed Feb. 1968, now abandoned, which is related to application Ser. No. 539,908 filed Apr. 4, 1966, now U.S. Pat. No. 3,471,393.

The present invention relates to the production of sulfite pulp of very high strength. More particularly, it relates to sulfite pulps of unusually high strength prepared by cooking in a medium of controlled alkalinity.

For most of its 100 year history, sulfite pulping technology has limited itself to the very acid range and calcium base (cold pH 1.3 to 1.5). After 1930, a narrow area close to the top of the sulfite pH scale was added and applied primarily to the chemical-mechanical high-yield pulping of hardwoods, using sodium base. A typical NSSC (neutral sulfite semichemical) cook of this kind used a liquor of pH 9 and the pH decreases during the cook to 7 or less. NSSC pulps are produced on a large scale and are chiefly used for the manufacture of container boards and other packaging materials.

After 1950, many attempts were made to advance sulfite technology by making use of the intermediate range of about pH 1.5 to pH 9. These attempts were partly successful and resulted in the commercial establishment of single-stage bisulfite processes with sodium and magnesium base (Arbiso, Magnefite) and two-stage processes with sodium base (Weyerhaeuser, Stora, Rauma).

Alkaline pulping processes involving sulfite have been proposed previously and are described in Canadian, U.S. and Norwegian patents. However, in all cases, the presence in the system of sodium sulfide was required to obtain the desired pulping action. For, as is well known to those conversant with the art, it is not possible to reach levels of lignin sufficiently low for fiber separation by cooking solely in sulfite or sulfite-carbonate solutions. In fact, the NSSC cook comes practically to a standstill as the pH decreases naturally to and below the pH 7 level.

It has been possible to increase the strength of sulfite pulps to some extent and, by the development of proper refining techniques, to increase the yield of usable pulp from wood to very high levels. But, although many of the sulfite pulps produced excel in brightness, cleanliness, ease of beating, bleachability and yield, none of these recent developments has resulted in strength properties which are convincingly near or equal to the level set by sulfate pulps, i.e., pulps produced by cooking in a solution of sodium hydroxide and sodium sulfide, but, by convention, based on the addition of sodium sulfate during recovery, so denominated.

After an uncertain start, the use of the sulfate pulping processes has expanded greatly, particularly since the second World War. Indeed, in recent years, the great majority of decisions regarding new installations in North America has been made in favor of the sulfate process. These decisions are based on three principal premises:

1. sulfate fibers make stronger paper or board than sulfite fibers;
2. The sulfate process includes a proven and now standard recaustisizing system to close the cycle of chemicals; and,
3. advanced, though more expensive, bleaching techniques are available to raise the brightness to high levels.

Nonetheless, some persistent difficulties encountered with the sulfate process are:

1. offensive odor due to mercaptans produced by the action of the sulfide;
2. low fiberization point;
3. resistance to beating;
4. low sheet density; and,
5. low fiber flexibility, and poor printing characteristics.

Then too, the bleaching of sulfate pulps presents a further difficulty.

Now, a way has been found to produce extremely strong pulps using sulfite and alkali and avoiding the use of sodium sulfide, the ingredient thought to be critical to kraft cooks (that is, the sulfate process) and the sulfide-sulfite process. Indeed, the pulps produced by the process of the present invention could properly be deemed "kraft pulps," having in mind that the term "kraft" derives from the Swedish word for strength, albeit the expression has, over the years, come to be used principally, if not exclusively, for sulfate process pulps.

The present invention therefore provides a process for the pulping of lignocellulosic material comprising the steps of comminuting the material, cooking the comminuted material at high temperature, and fiberizing the cooked material, the improvement consisting of cooking the material in a sulfide-free alkaline sulfite liquor in which the alkalinity is maintained throughout the cook in the range of about pH 8 to about pH 11 as measured *in situ* at the cooking temperature, the pH being maintained within the specified limits by addition of a strong base.

Equipment for the direct measurement of the pH value during a wood pulping or cooking process has been developed in recent years. Important elements of this type of equipment are protected by a patent granted to the Pulp and Paper Research Institute of Canada and an improvement thereon is covered by copending U.S. Pat. Ser. No. 539,908, filed Apr. 4, 1966 issued in Canada to Canadian Pat. No. 794,495 on the 10th of Sept. 1968, Sept., 1968. By means of this equipment, it is now possible to measure and facilitate the control of the pH level (hydrogen ion activity) during the cooking process.

Using such hot pH equipment in a recent study of the total field of sulfite pulping, it was possible to resolve much of the confusion existing in previous literature regarding the effect of individual cooking variables, and to isolate the pH factor as being of direct influence on all pulp qualities. See TAPPI, Vol. 50, pp. 597 to 614.

It was found in this work that high levels of burst, tensile, tear, and folding strength are naturally connected with certain high levels of pH. It was also found that large variations in physical pulp properties are due to relatively small variations in pH level.

Another relevant finding was that the tear strength, folding resistance, and intrinsic viscosity of the pulp continue to increase with increasing hot pH levels above pH 6 and that no optimum for tear strength has been reached at hot pH 9.5. On the other hand, tensile and bursting strength were found to exhibit optima at hot pH 8 and these optima are coincident with the xylan maximum of the pulp.

These levels and optima refer to black spruce and are expected to vary to some degree if other plant species are used, due to the natural variations in composition, ratios, and chemistry of the carbohydrate components of different woods and other lignocellulosic materials. But, a behavior similar to the above for spruce has been observed with a hardwood mixture composed chiefly of poplar, birch and maple.

Another effect brought to notice after the development of hot pH measurement apparatus, and which is commonly overlooked in pulping systems, is the shift in the ionic concentration of water due to temperature rise. The medium in liquid-phase cooks is for the most part water, and any intrinsic changes of its ionic composition will cause large effects on the ionic equilibria of solutes. Due to this effect, the ionic dissociation constant of water increases on heating, causing the $H^+$ or $OH^-$ concentration to rise from the level of $1 \times 10^{-7}$ mole per liter (pH 7 or pOH 7) at room temperature to $2 \times 10^{-6}$ mole per liter (pH or pOH 5.70) at 200° C., or about 20 times. Consequently, a sodium hydroxide solution of pH 12 at 25° C. has a pH of 9.39 at 200° C., and the pH of a sulfate-type liquor with no wood present is found to be about 13.5 at room temperature and only about 10 at 166° C. In cooks with wood chips, the actual or hot pH values are even lower because of the consumption of some hydroxide for the neutralization of wood acids, either natural or formed in the cooking process.

From this brief discussion, it will be clear that changes of the hydrogen and hydroxyl ion concentrations in alkaline cooks have been neglected as a basic factor in pulping kinetics and pulp quality, and that their control can open new areas in pulping.

This applies particularly to the sulfite cook where previously no intelligent control to compensate for the effects of temperature rise and acid neutralization during the digestion process has been known. This, however, is the key to obtaining complete cooks and pulps of very high strength in sulfite cooks.

Thus, the present discovery that valuable pulps can be produced with alkaline sulfite liquors and without resort to sodium sulfide of mechanical refinement arises out of not-previously-available findings concerning the significance of "hot pH," which is an actual measure of the hydrogen ion activity as it exists at the temperature and pressure of the digester of cooking vessel.

The following examples will serve to disclose both the procedure used in pH-controlled sulfite cooks, and significant properties of the novel pulps obtained, in accordance with the present invention.

Example I (Sulfate control cooks at low and intermediate yield)

An experimental digester equipped with forced circulation and indirect heating was packed with commercial chips of eastern white spruce. The charge was presteamed for 15 minutes and the prepared liquor of 83 percent activity and 30 percent sulfidity was added to give 3:1 liquor/wood ratio and a chemical charge of 18 percent active alkali on O.D. wood. The temperature was raised to 166° C. in 90 minutes and held sufficiently long to give 1) a slush pulp (Cook A) of 47.2 percent yield at a Kappa No. of 27 and 2) a refinable pulp of 63.3 percent yield at a Kappa No. of 140 (cook D).

Example II (Sulfate control cook at very high yield)

With equipment, cellulosic material, liquor and presteaming the same as in example I, the temperature was raised to 166° C. in 10 minutes. The contents were blown immediately to give a pulp of 78.5 percent yield at a Kappa No. of 153 (cook G).

Example III (Alkaline sulfite cooks at controlled pH 8.0 to give low, intermediate, and very high yield)

Using the same digester and cellulosic material as in examples I and II, the charge was presteamed for 15 minutes. Sulfite liquor of 6 percent $SO_2$ concentration and pH 8.0 was added to give a 3:1 liquor/wood ratio. The temperature was raised to 166° C. in 90 minutes and held at this level for different time intervals to give (1) cook B, a slush pulp of 46.3 percent yield at a Kappa No. of 46: (2) cook E, an intermediate yield of 67.8 percent at a Kappa No. of 127; and (3) cook H, a very high-yield pulp of 76.4 percent yield at a Kappa No. of 148. Throughout these cooks, the hot pH in the digester is controlled at the pH 8 level by injection of a NaOH solution.

Example IV (Alkaline sulfite cook controlled at pH 9 to give an intermediate yield)

Using the same equipment as in previous examples and black spruce, the charge is presteamed for 15 minutes. A sulfite solution of 6 percent $SO_2$ and pH 9.0 is added to give a 4.5:1 liquor/wood ratio and the temperature is raised to 145° C. in 90 minutes. The hot pH is controlled at 9.0 during the cook by injection of a NaOH solution. The temperature is held at 145° C. to give a pulp of 64.6 percent yield at Kappa No. 131 (cook F).

Example V (Alkaline sulfite cook controlled at pH 9.5 to give a low yield slush pulp)

Using the same equipment and raw material as in the examples I to III, the charge is presteamed for 15 minutes. A sulfite solution of 6 percent total $SO_2$ and pH 9.5 is added to give a 3.5:1 liquor/wood ratio and the temperature is raised to 175° C. in 90 minutes. The hot pH is controlled at 9.5 during the cooking by injection of a NaOH solution into the digester. The temperature is held at 175° C. for 90 minutes to give a pulp yield of 45.6 percent at Kappa No. 23 (cook C).

Pertinent analytical and test data from pulps prepared in the foregoing examples are collected in attached table I. A comparison of the data shows that kraft strength can be easily obtained by a sulfite process at controlled levels of alkalinity. This indicates that it is the hydroxyl ion concentration, rather than the concentration or type of sulfur chemical used in the process, which determines the strength properties of the pulps produced.

The data show also that there are distinct advantages of the alkaline sulfite process over the common sulfate (alkaline sulfide) process at higher levels of pulp yield and particularly at the very high levels represented so far by the NSSC process. The ability of sulfite to soften the lignin binder in the middle lamella, and thus to increase fiberability, becomes a distinct advantage at the higher yield levels. The beneficial effect on fiberability is also reflected in shorter beating times. Another advantage apparent from the data is a considerably higher pulp brightness at the higher levels of yield. This again is of particular interest in the manufacture of boards.

An important advantage of these sulfite pulps over pulps cooked with sulfide is the ease with which they can be bleached to high brightness. A laboratory comparison under controlled conditions shows that only 3–4 bleaching stages are required to surpass 90 percent brightness and that the pulp viscosities are very satisfactory. The brightness reversion of the four-stage alkaline sulfite pulps is similar to that of six-stage sulfate pulps, compared at equal yield. When compared at equal lignin, the alkaline sulfite pulps are clearly superior. These advantages which could have been expected from the known behavior of sulfite lignins considerably strengthens the position of sulfite pulps of high strength.

An undesirable feature of the sulfate process, and of great and mounting concern to those associated actively or passively with this pulping process, is the very offensive odor of the spent liquor. The odor is due to mercaptans which are inevitably formed in the reaction of sulfide with methoxyl groups of lignin and hemicelluloses. The amount of odorous substances formed in the sulfate or similar cooking processes has been related to the amount of sulfur, as sodium sulfide, charged to the process. The tolerance limits for mercaptans are very low, of the order of 0.0001 to 0.001 mg./m.$^3$ air, and the sensation remains unpleasant down to very low levels of concentration.

Major sources of odor in a sulfate installation are the waste gases from cooking, evaporation and black liquor combustion, but it is clear that in order to completely eliminate the typical sulfate odor it would be necessary to seal hermetically all containers, lines and channels carrying spent liquor or gases.

It is a significant feature of the process of this invention that the odor of the spent liquor is very weak and pleasant rather than unpleasant. Since the cooking agents are sulfite and hydroxyl ions there is no chance to form mercaptans in the process and the odor arises, rather, from resinous wood extractives which, by nature, have a pleasant smell.

Thus the present invention achieves the preparation of cellulosic pulps having a strength equal to or, in some cases, greater than sulfate by means of an alkaline sulfite cooking process which is virtually odorless.

In a chemical recovery cycle serving the new process, odorless conditions will prevail anywhere before the combustion process, and the familiar problem there will be the control of h$_2$S and $SO_2$ emission to the atmosphere and the recovery of the sulfur values.

It should be evident also that the obnoxious smell of $SO_2$ which has been a characteristic of sulfite operation of the traditional kind (acid bisulfite process with free $SO_2$) does not arise in alkaline sulfite cooking because all $SO_2$ present is held in the state of the sulfite ion $SO_3^{--}$.

While the examples given in the description of this invention include alkaline sulfite cooking processes where the hot pH is controlled at a constant level, this cannot be considered a limitation to the type of pH control applied. As specific pulp qualities are developed from various woods or other lignocellulosic materials by the application of this technique to meet various end uses, it may be found advantageous to control the pH during the cook along different patterns involving horizontal and sloped sections, and sudden steps, for obtaining optimum results. Such modifications of the basic technique are self-evident and are therefore part and parcel of the present disclosure.

Also the use of NaOH only as a means to create an environment of controlled high alkalinity and the use of water only as the solvent phase of the cooking liquor cannot be considered limitations of this disclosure of a cooking process employing controlled alkalinity for achieving outstanding pulp characteristics, particularly strength. With increasing sophistication of pulping processes, and particularly with the advent of fully closed manufacturing systems, no limitation, costwise or other, need be imposed on the pulping medium used, e.g., solvents other than water may be considered. The alkalinities obtainable in such systems may be at least equal to or higher than those of solutions of NaOH or other common bases in water. The use of a solution of a strong base in any of the alcohols would be an example.

We claim:

1. In a process for the pulping of lignocellulosic material comprising the steps of comminuting the material, cooking the comminuted material at temperatures of about 145° C. and above, and fiberizing the cooked material, the improvement consisting of cooking the material in a sulfide-free alkaline sulfite liquor in which the alkalinity is maintained throughout the cook in the range of about pH 8 to about pH 11 as measured *in situ* at the cooking temperature, the pH being maintained within the specified limits by addition of a strong base.

2. A process as in claim 1 wherein the pH is maintained within the range of pH 9–11 by addition of alkali.

3. A process as in claim 1 wherein the cellulosic material is wood.

4. A process as in claim 1 wherein the pH is maintained within the specified limits by addition of sodium hydroxide.

5. An alkaline sulfite pulp prepared by the process of claim 1.

* * * * *